June 23, 1964  J. H. HOLLAND  3,138,392
EQUIPMENT HOOKUP DEVICE
Filed Dec. 17, 1962
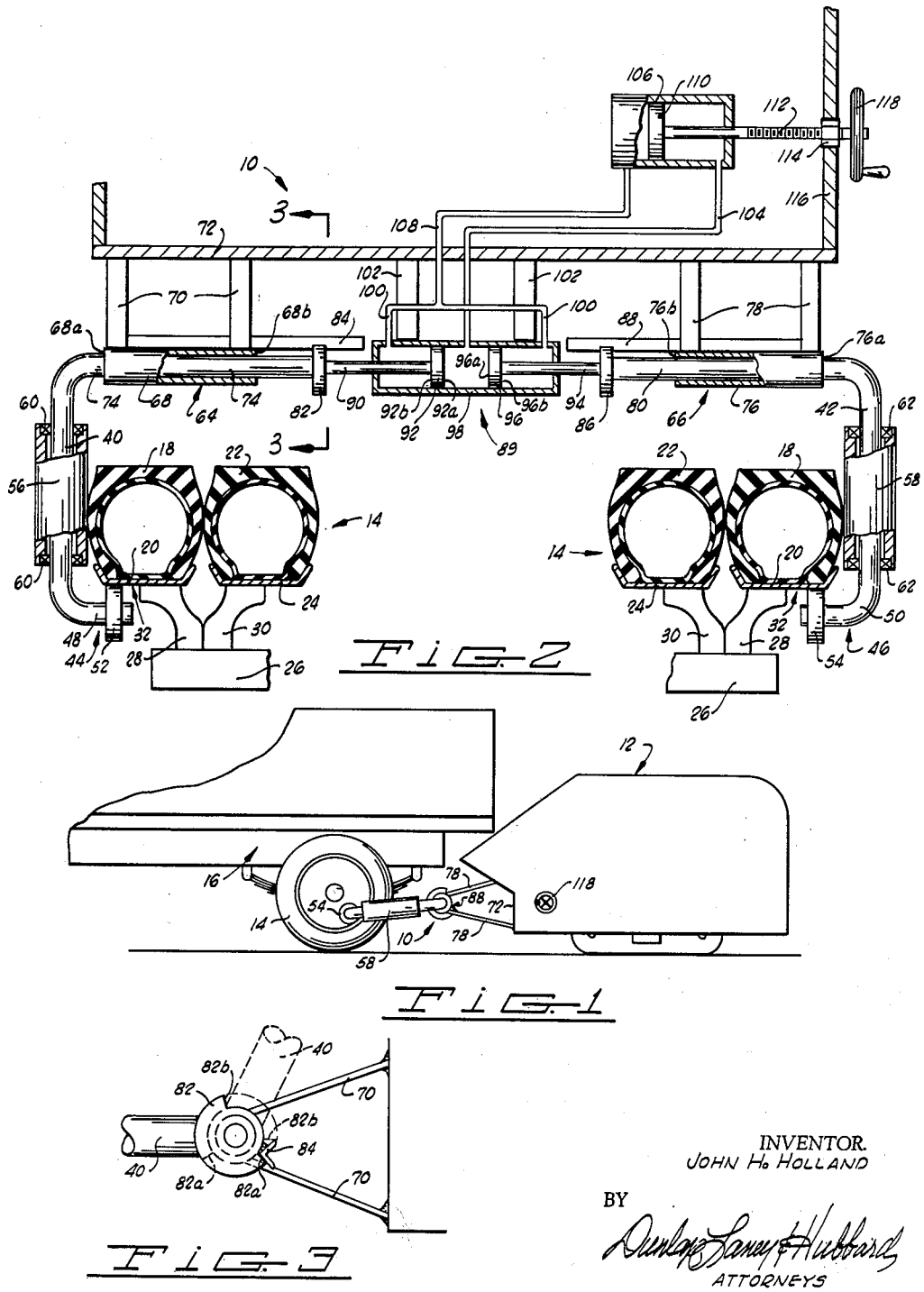
INVENTOR.
JOHN H. HOLLAND
BY
Dunlap Lanny & Hubbard
ATTORNEYS

United States Patent Office 3,138,392
Patented June 23, 1964

3,138,392
EQUIPMENT HOOKUP DEVICE
John H. Holland, Norman, Okla., assignor to J. H. Holland Company, Norman, Okla., a corporation of Oklahoma
Filed Dec. 17, 1962, Ser. No. 245,159
11 Claims. (Cl. 280—447)

The present invention relates to a device for connecting a first vehicle or similar piece of equipment to a second vehicle or other piece of equipment.

As is well known in the art, many instances arise in which it is necessary to connect a first vehicle to a second so that one of the vehicles can be pushed or pulled by the other. For example, one method for paving streets and the like with asphalt entails dragging a spreader box behind a dump truck carrying a load of premixed asphalt and aggregate. As the truck tows the spreader box, the load of asphalt is dumped into the spreader box and is spread in a layer of uniform thickness behind the box, and when subsequently compacted by a suitable roller forms an adequate pavement for light traffic. In most cases a number of dump trucks are used to shuttle the pre-mixed asphalt from an asphalt plant to the spreader box. Each truck is connected to the same spreader box and provides the propulsion power for the spreader box as it dumps its load of asphalt. Therefore it will be evident that in the course of paving a street of any size, the spreader box must be connected to a truck and disconnected many times. Hitches presently in use for this purpose are manually actuated and require an extra helper who must position himself between the truck and the spreader box in order to make the connection. In addition to being dangerous, this type of operation can be very time consuming and therefore costly.

The present invention relates to an improved hookup device which is particularly adapted to connect an asphalt spreader box to a dump truck, although it is to be understood that the hookup device can be utilized to interconnect a great variety of vehicles and like devices, as will hereafter be more evident to those skilled in the art. In general, the hookup device constructed in accordance with the present invention is adapted to connect a first vehicle, such as the spreader box, to a second vehicle, such as the dump truck which has a pair of support wheels each having a rim. The hookup device comprises, in general, a pair of arms which are connected to the first vehicle by suitable means for permitting sliding movement of the arms transverse to the vehicle while simultaneously permitting a limited degree of pivotal movement in vertical planes. Cleat means are provided on the forward ends of the arms for engaging the rims of the support wheels of the second vehicle, and fluid power means are provided to move the arms alternately toward each other, so that the cleat means will engage the rim portions of the support wheels, and away from each other, so that the cleat means will be withdrawn from the rim portions and permit disconnection of the two vehicles. Further details of the invention will be evident from the following disclosure and appended claims, it being understood that the scope of the invention is to be limited only by the hereafter appended claims.

Therefore it is an important object of the present invention to provide an improved hookup device for interconnecting two vehicles, or the like, very quickly and safely by a single operator.

Another object of the present invention is to provide a hookup device of the type described which can be operated remotely, thereby eliminating the necessity of a workman positioning himself between the two vehicles in the manner required to operate a more conventional hitch.

Still another object of the present invention is to provide a hookup device of the type described which requires no special attachment or hookup device on one of the vehicles other than conventional support wheels.

Still another object of the present invention is to provide a hookup device of the type described which will compensate for uneven ground.

Yet another object of the present invention is to provide a hookup device of the type described which can be connected and disconnected even when the vehicles are not precisely aligned, and also one which will transmit only a longitudinal force when somewhat transversely disaligned.

A still further object of the present invention is to provide a hookup device of the type described which can be utilized to either push or pull a vehicle or to maintain a predetermined spacing between a pair of vehicles.

Yet another object of the present invention is to provide a hookup device of the type described which will permit relative transverse movement between the two vehicles while the vehicles are in motion.

Another object of the present invention is to provide a fluid operated hookup device of the type described in which no appreciable hydraulic pressure is required and which is therefore safe in operation and will have a long service life.

A still further object of the present invention is to provide a hookup device of the type described which can be economically manufactured.

Yet another object of the present invention is to provide a hookup device of the type described which has no fluid pumps or expensive valves, and yet which can be quickly and easily operated by a single operator.

Many additional objects and advantages of the present invention will be evident to those skilled in the art from the following detailed description and drawings, wherein:

FIG. 1 is a side elevational view of a hookup device constructed in accordance with the present invention for connecting a conventional asphalt spreader box to a conventional dump truck;

FIG. 2 is a plan view, somewhat schematic and partially broken away to show details of construction, of the hookup device shown in FIG. 1; and FIG. 3 is a sectional view taken substantially on lines 3—3 of FIG. 2.

Referring now to the drawings, and in particular to FIG. 1, a hookup device constructed in accordance with the present invention is indicated generally by the reference numeral 10. The hookup device 10 is affixed to a conventional asphalt spreader box, indicated generally by the reference numeral 12, and is used to connect the spreader box 12 to the rear support wheels 14 of a conventional dump truck, indicated generally by the reference numeral 16. The support wheels 14 will in almost all cases be of the standard dual wheel type, each of the support wheels 14 having an outer pneumatic tire 18 mounted on an outer cylindrical rim 20 and an inner pneumatic tire 22 mounted on an inner rim 24. The rims 20 and 24 are connected to a hub 26 by suitable spoke means 28 and 30, respectively. It will be noted that as illustrated the rim 20 has a generally cylindrical inner surface 32. However, various types of dual wheel rims have different contours. For example, some tire rims have generally frusto-conical inner surfaces. Nevertheless, a hookup device constructed in accordance with the present invention will be operative on nearly all standard make dual wheel rims.

The device 10 is comprised of a pair of arm members, indicated generally by the reference numerals 40 and 42, which extend horizontally from the front end of the spreader box 12 generally in parallel relationship. The arms 40 and 42 may conveniently be fabricated from tubular stock and have cleat means, indicated generally by the reference numerals 44 and 46, respectively, at the free ends for engaging the surfaces 32 of the rims 20 of the support wheels 14. The cleat means 44 and 46 may conveniently comprise inturned portions 48 and 50 of the tubular stock which serve as journals for rollers 52 and 54, respectively, which engage the inner face 32 of the rim 20 in order to interconnect the two vehicles 12 and 16, as hereafter described in greater detail. Sleeve-type rollers 56 and 58 are preferably rotatably journaled on the arm members 40 and 42 which, as mentioned, may be fabricated from tubular stock. The sleeve-type rollers 56 and 58 may be mounted on suitable ball bearings 60 and 62, or may simply ride on the tubular arm members 40 and 42 with any suitable conventional means (not illustrated) provided to prevent longitudinal slippage of the respective roller sleeves.

Each of the arm members 40 and 42 is connected to the spreader box 12 by a journal means, indicated generally by the reference numerals 64 and 66, respectively, in such a manner as to be free to pivot through a limited arc in a vertical plane while simultaneously being free to slide transversely of the spreader box 12 and dump truck 16, as will presently be evident. The journal means 64 comprises a journal sleeve 68 which is connected by suitable braces 70 to the front plate 72 of the spreader box 12. The journal sleeve 68 slidably and pivotally receives a journal pin 74 which is connected to the arm member 40 at a right angle. As a practical matter, it is convenient to fabricate the journal pin, the arm member 40 and the inturned portion 48 of the cleat means 44 from the same tubular stock, such as steel pipe. In any event, the journal pin 74 is cylindrical in shape and is free to pivot and also slide longitudinally within the journal sleeve 68. The journal means 66 is of the same type construction as the journal means 64 and comprises a journal sleeve 76, which is connected by suitable braces 78 to the plate 72 of the spreader box 12, and a journal pin 80 which is connected at a right angle to the arm member 42 and which is free to rotate and slide longitudinally within the journal sleeve 76.

Rotational movement of the journal pin 74 within the journal sleeve 68 is limited by a cam disc 82 which is connected to the innermost end of the journal pin 74 and, as best seen in FIG. 3, has a cutaway segment which produces cam faces 82a and 82b. A suitable elongated stop 84 is connected to the journal sleeve 68 or to other rigid structure and extends parallel to the longitudinal axis of the journal pin 74. The elongated stop member 84 may conveniently be fabricated from a length of angle iron stock and may be welded to the brackets 70 and to the journal sleeve 68. The cam faces 82a and 82b of the cam 82 are so positioned with respect to the arm member 40 that the cam face 82a will engage the elongated stop member 84 when the arm member 40 is substantially in the horizontal position as illustrated in FIG. 3. When the arm member 40 is pivoted upwardly to the position shown in dotted outline in FIG. 3, the cam face 82b will contact the elongated stop member 84 and the cam face 82a will assume the position shown in dotted outline.

A substantially identical cam disc 86 is connected to the inner end of the journal pin 80 and has correspondingly oriented faces which engage the elongated stop member 88 which corresponds to the stop member 84 and is connected to the journal sleeve 76. The cam disc 86 therefore limits the downward pivotation of the arm member 42 to substantially the horizontal position and permits the arm member 42 to pivot upwardly to a position corresponding to the position of the arm member 40 shown in dotted outline and previously described. It will also be noted that the cam discs 82 and 86 serve as stop means to limit the transverse movement of the journal pins 74 and 80 in the outward direction and that the arm members 40 and 42 limit the transverse movement of the respective journal pins toward the center. The spacing between the respective cam discs and arm members with relationship to the length of the journal sleeves is important for optimum and foolproof operation of the device 10, as will hereafter be described in greater detail. It will be noted that when the arm members 40 and 42 are in the lower, generally horizontal positions, the arm members 40 and 42 are sufficiently high for the cleat means 44 and 46 to pass over the rims 20 of the support wheels 14. When in the upper positions, the arm members 40 and 42 are past the vertical so that the arms will remain in the upright position for transport, as will hereafter be described in greater detail.

A fluid powered means, indicated generally by the reference numeral 89, interconnects the arm members 40 and 42 and provides a means for moving the arm members 40 and 42 alternately toward or away from each other for purposes which will presently be evident. The fluid powered means 89 comprises a piston rod 90 and piston 92 which are connected to the cam disc 82 and therefore to the journal pin 74 and arm member 40. A similar piston rod 94 and piston 96 are connected by the cam disc 86 and journal pin 80 to the arm member 42. Each of the pistons 92 and 96 is reciprocally disposed within a suitable fluid cylinder 98 to form a fluid motor or linear actuator. It will be noted that the facing fluid working surfaces formed by the inner faces 92a and 96a of the pistons 92 and 96 are in continuous fluid communication. A fluid conduit 100 extends between the opposite ends of the fluid cylinder 98 so that the opposite fluid working surfaces formed by the outer faces 92b and 96b are in continuous fluid communication. The cylinder 98 is connected by suitable brackets 102 to the front plate 72. Although a single cylinder 98 is illustrated, it will be appreciated that the pistons 92 and 96 could be reciprocally disposed in separate fluid cylinders so long as the inner faces 92a and 96a are placed in continuous fluid communication, and the outer faces 92b and 96b are in fluid communication.

A fluid conduit 104 is connected to the cylinder 98 at a point between the two inner faces 92a and 96a of the pistons 92 and 96. The other end of the fluid conduit 104 is connected to one end of a second fluid cylinder 106. Another fluid conduit 108 is connected to the fluid conduit 100 which is connected at the opposite end of the cylinder 98 so as to place the conduit 108 in fluid communication with the faces 92b and 96b of the fluid pistons 92 and 96. The other end of the fluid conduit 108 is connected to the end of the second fluid cylinder 106 opposite the end to which the conduit 104 is connected. A fluid piston 110 is reciprocally disposed within the second cylinder 106 and is moved by a piston rod 112 which extends through one end of the cylinder 106. The outer end of the piston rod 112 is threaded through a suitable nut 114, which in practice may be connected to the side wall 116 of the spreader box 12. A hand wheel 118 is connected to the end of the piston rod 112 and when rotated in one direction the threaded piston rod 112 and therefore the fluid piston 110 will be moved from left to right to force fluid in the second cylinder 106 through the conduit 104 into the fluid cylinder 98 to act on the piston faces 92a and 96a. At the same time, fluid in the opposite ends of the fluid cylinder 98 will be forced by the pistons 92 and 96 through the conduit 100 and conduit 108 into the other end of the second cylinder 106 so that the arm members 40 and 42 will be spread apart. When the hand wheel 118 is rotated in the opposite direction, fluid will be forced from the cylinder 106 through the conduits 108 and 100 and pressure applied to the outer faces 92b and 96b of the pistons 92 and 96. Fluid will pass from between the pistons 92 and 96 through the conduit 104 to the second cylinder 106 and the arm members 40 and 42 will be moved together. It will be noted that the cylinder 106 may be located at any point on the spreader box 12 remote from the remainder of the hookup device 10. For example, the cylinder may be mounted adjacent the front of the spreader box 12 with the threaded piston rod 112 extending through the left-hand side wall 116 adjacent the forward end of the spreader box 112 substantially as shown in FIG. 1.

When connecting the spreader box 12 to the dump truck 16, the operator rotates the hand wheel 118 counterclockwise to move the piston 110 from left to right when referring to FIG. 2, to cause the pistons 92 and 96 to spread apart, thereby sliding the journal pins 74 and 80 longitudinally through the journal sleeves 68 and 76 and spreading the arm members 40 and 42 apart. The hand wheel 118 is rotated until the cleat means 44 and 46 are spread apart enough for the support wheels 14 of the dump truck 16 to pass between the cleat means. The dump truck operator then backs the truck support wheels 14 between the cleat means 44 and 46. It will be appreciated that the operator standing adjacent the hand wheel 118 is in good position to see when the wheels 14 have cleared the cleat means 44 and 46. The operator then rotates the hand wheel 118 clockwise so as to move the piston 110 from right to left, still referring to FIG. 2, and force fluid from the cylinder 106 through the conduits 108 and 100 into the opposite ends of the cylinder 98 to act on the piston faces 92b and 96b. The pistons 92 and 96 and therefore the arm members 40 and 42 will be moved together until the sleeve rollers 56 and 58 engage the outer sides of the support wheels 14 substantially as illustrated in FIG. 2. When the truck is driven forward slightly, the rollers 52 and 54 of the cleat means 44 and 46, respectively, will engage the inner surfaces 32 of the rims 20 of the respective support wheels 14. The spreader box 12 is then connected to the dump truck 16 because as the dump truck is driven forward the rollers 52 and 54 will ride on the rims 20 and will drag the spreader box 12 behind the dump truck 16. The dump truck operator then slowly dumps the load of asphalt into the spreader box 12 as the two vehicles move along and the asphalt will simultaneously be spread in a uniform layer upon the ground.

As previously described, the arm members 40 and 42 are free to pivot in vertical planes within the limits dictated by the cam discs 82 and 86. This is true because the pistons 92 and 96, the piston rods 90 and 94, and the journal pins 74 and 80 are all cylindrical in shape and are received in cylindrical sleeve members so as to provide free pivotal movement of the arms regardless of the transverse position of the arms, as will presently be described. Further, it will be noted that the arm members 40 and 42 are free to pivot independently of one another so that if the wheels 14 of the dump truck 16 travel over uneven terrain for any reason the arm members are free to move independently. But even more importantly, the arm members 40 and 42 are free to be displaced transversely of the spreader box 12 while being maintained at the same spacing so that the rollers 52 and 54 will continually engage the rims of the wheels 14. As previously mentioned, the journal pins 74 and 80 are free to move longitudinally within the journal sleeves 68 and 76 and therefore transversely of the spreader box 12. This is permitted by the fact that the inner faces 92a and 96a of the pistons 92 and 96 are in fluid communication and the outer faces 92b and 96b are in fluid communication through the fluid conduit 100. Therefore if the dump truck 16 becomes transversely displaced relative to the spreader box 12 so as to force the arm member 42 to the right when referring to FIG. 2, the piston 96 will move to the right and displace fluid from the right-hand end of the cylinder 98 through the fluid conduit 100 to the left-hand end of the cylinder 98 and act upon the face 92b of the cylinder 92 to maintain the desired spacing between the pistons 92 and 96 as dictated by the position of the hand-actuated piston 110 within the second cylinder 106. Therefore it will be noted that regardless of the spacing between the pistons 92 and 96, the arm members 40 and 42 are free to move transversely of the spreader box 12 within limits defined by the cam discs 82 and 86 and the junction between the journal pins 74 and 80 and the arm members 40 and 42, as will presently be described.

When it is desired to disconnect the spreader box 12 from the dump truck 16, the hand wheel 118 is merely rotated counterclockwise so as to move the piston 110 from left to right when referring to FIG. 2. Fluid will then be forced through the conduit 104 into the cylinder 98 between the pistons 92 and 96 to force the pistons and therefore the arm members 40 and 42 apart until the cleat means 44 and 46 clear the support wheels 14 of the dump truck 16.

When spreading asphalt it is essential that the spreader box move in a single, uninterrupted sweep in order to maintain a single, uniform layer of asphalt. It is frequently difficult to precisely align each truck with the spreader box when using more conventional hookup devices. However, when utilizing the hookup device 10, the dump truck need not be precisely aligned with the spreader box 12 because the arm members 40 and 42 are free to float transversely of the spreader box 12. The fluid powered means 89 will automatically move the arms to the correct spacing around the wheels 14 when the sleeve rollers 56 and 58 engage the outer faces of the respective wheels and will thereby maintain the rollers 52 and 54 of the cleat means in engagement with the rims 20. However, it will be appreciated that the transverse movement of the arm members 40 and 42 is necessarily limited by the cam discs 82 and 86 and the arm members 40 and 42 and that there may be instances when the arm members 40 and 42 are moved as far to one side as possible. When this occurs, both arm members 40 and 42 must still be moveable outwardly a sufficient distance to disengage the respective cleat means 44 or 46 from the wheel rim 20 because neither the spreader box 12 nor the dump truck 16 can be moved transversely without disrupting the uniform layer of asphalt being spread. Also, there is never any assurance that when fluid is introduced between the pistons 92 and 96 both pistons will move outwardly at a uniform rate. Both of these problems can be accommodated by controlling the length of the journal pins with respect to the journal sleeves and insuring that the pistons 92 and 96 have a sufficiently long stroke.

Referring once again to FIG. 2, it will be noted that the journal pin 74 is free to move inwardly until the arm member 40 contacts the outer end 68a of the journal sleeve 68. On the other hand, the journal pin 74 is free to move outwardly until the cam disc 82 contacts the inner end 68b of the journal sleeve 68. Similarly, the journal pin 80 is free to move inwardly until the arm member 42 contacts the outer end 76a of the journal sleeve 76, and is free to move outwardly until the cam disc 86 contacts the inner end 76b. When the arm members 40 and 42 are in the retracted positions illustrated in FIG. 2 so as to engage the outer sides of the outer tires 18, the spacing between the cam discs 82 and 86 and the inner ends 68b and 76b of the respective adjacent journal sleeves should be greater than the total distance between the outer ends 68a and 76a of the respective journal sleeves and the arm members 40 and 42, respectively, by a distance corresponding to the total distance which the arm members 40 and 42 must be spread apart in order for the cleat means 44 and 46 to clear the rims 20 in which they are inserted. Then, assuming that the truck 16 becomes transversely displaced with respect to the spreader box 12 until the arm member 40 contacts the end 68a, the cam disc 86 will still be spaced from the inner end 76b of the opposite journal sleeve 76 a sufficient distance to permit the journal pin 80 and therefore the arm member 42 to be moved outwardly a sufficient distance for the roller 54 to clear the rim 20 and tire 18, so that the truck can be disconnected from the spreader box 12. Similarly, if the arm member 42 contacts the outer end 76a when the arm members 40 and 42 are in the inner position against the tires 18, the opposite cam disc 82 should be spaced from the inner end 68b of the opposite journal sleeve 68 a sufficient distance to permit the arm member 40 to be moved outwardly a distance sufficient for the roller 52 to clear the wheel to which it is connected.

Since it cannot be predicted which of the journal pins 74 or 80 will move first when fluid is introduced between the pistons 92 and 96, the pistons 92 and 96 should have sufficient travel to force the cam disc 82 against the end 68b of the journal sleeve 68 and the cam disc 86 against the inner end 76b of the journal sleeve 76. Then, even assuming the worst condition when the truck 16 has become transversely disaligned with the spreader box 12 until the arm 40 engages the outer end 68a of the journal sleeve 68, and for some reason the arm 42 is placed in a bind so that when fluid is introduced between the pistons 92 and 96, only the piston 92 is free to move outwardly, the cleat means can still be moved outwardly a sufficient distance to be disengaged. In this case, the cam disc 82 will be moved outwardly until it engages the inner end 68b of the journal sleeve 68. Then a substantial force can be exerted against the piston 96 to move the journal pin 80 and arm 42 outwardly and thereby disconnect the roller 54 from the rim 20. In this respect, it should be noted that the arm 40 contacted the outer end 68a of the journal sleeve 68 before the cam disc 86 contacted the inner end 76b of the journal sleeve by the distance required for the arm 42 to move outwardly and disengage the roller 54 from the rim 20.

Although a particular preferred fluid powered means 89 for moving the arm members 40 and 42 alternately in opposite directions inwardly and outwardly has been described, the use of other types of fluid powered means for this purpose is within the broad aspects of the present invention. For example, a simple linear actuator having a single piston in a fluid cylinder could be employed, in which case the cylinder could be connected to the rod 90, for example, and the piston to the other rod 94. Then the cylinder would be free to float transversely of the spreader box 12 and the fluid conduits connected to the cylinder made flexible so as to permit transverse displacement of the cylinder as well as rotational displacement of the cylinder to permit the arm to which the cylinder is attached to be pivotally raised and lowered.

From the above detailed description, it will be evident that a considerable force can be exerted on the arm members 40 and 42 by reason of the inclined planes of the threaded piston rod 112 so that the fluid pistons 92 and 96 can be made somewhat smaller than the fluid piston 110. This will of course decrease the travel required of the piston 110 in order to obtain maximum travel of the pistons 92 and 96. It will also be appreciated that the cylinder 106 and associated structure can be located at any position desired on the spreader box 12 to facilitate remote operation of the hookup device 10. It will also be evident to those skilled in the art that while the fluid cylinder 106 and associated structure provides a very economical means for actuating the device 10 in that no precision pumps or valves are required, any conventional fluid means for alternately introducing fluid under pressure to the conduits 104 and 108 can be utilized within the broader aspects of the invention.

It will also be appreciated that the hookup device 10 can be used to push one vehicle by another simply by orienting the rollers 52 and 54 on the opposite sides of the rims 20. Further, it will be evident that the device 10 can be connected to the inner rims 24 of the wheels merely by projecting the cleat means 44 and 46 outwardly from the arm members 40 and 42. Also, it should be noted that in its broader aspects, the hookup device 10 can be utilized to interconnect any two vehicles or similar devices so long as one of the devices is provided with means equivalent to the rims of the support wheels into which the cleat means can be inserted.

Having thus described a preferred embodiment of the present invention in detail, it is to be understood that various changes, substitutions and alterations can be made therein without departing from the spirit and scope of the invention as defined by the appended claims.

What is claimed is:

1. A hookup device for connecting a first vehicle having a longitudinal dimension defined by opposite ends to a second vehicle having a pair of support wheels each having a rim portion, the hookup device comprising:

a pair of arm members for connection to the first vehicle;

journal means for connecting one end of each of the arm members to the first vehicle, each of the journal means permitting pivotal movement of the respective arm members in a vertical plane, the vertical planes being disposed in parallel relationship extending longitudinally of the first vehicle, each journal means permitting transverse movement of the arm members relative to the first vehicle whereby the arm members can be moved toward and away from one another;

fluid powered means connected to the arm members for moving the arm members in opposite directions alternately toward and away from one another; and cleat means connected to the ends of the arm members remote from the first vehicle for engaging the rim portions of the support wheels of the second vehicle, the cleat means extending in opposite directions from the respective arm members, whereby the cleat means will engage the rim portions when the arm members are moved in one of said opposite directions and the cleat means will be disengaged from the rim portions when the arm members are moved in the opposite direction.

2. A hookup device for connecting a first vehicle having a longitudinal dimension defined by opposite ends to a second vehicle having a pair of support wheels each having a rim portion, the hookup device comprising the combination as defined in claim 1, wherein:

each of the journal means comprises a journal sleeve member and a journal pin member, the journal pin member being rotatably and slidingly received in the journal sleeve member, one member of each of the journal means being connected to one of the arms at right angles thereto, the other member being connectable to the first vehicle, the members of the respective journal means being disposed horizontally and transversely of the first vehicle.

3. A hookup device for connecting a first vehicle having a longitudinal dimension defined by opposite ends to a second vehicle having a pair of support wheels each having a rim portion, the hookup device comprising:

a pair of journal sleeve members connected to one end of the first vehicle, the journal sleeve members being horizontally disposed and generally aligned transversely of the first vehicle;

a journal pin member disposed in each journal sleeve member for rotational and sliding movement in the respective journal sleeve member;

fluid motor means connected to the journal pin members for slidably moving the pin members longitudinally of the respective sleeve members in alternate directions toward and away from each other;

an arm member connected at one end to each of the journal pin members and extending from the first vehicle in generally parallel relationship one to the other and normal to the journal pin members; and, cleat means connected to each of the arm members for engaging one of the rim portions, the cleat means extending in opposite directions and being disposed generally parallel to the journal pin members, whereby when the fluid motor means is actuated to move the journal pin members in one alternate direction, the cleat means will be moved into engagement with the rims and when the fluid motor means is actuated to move the journal pin members in the other alternate direction, the cleat means will be disengaged from the rims.

4. A hookup device for connecting a first vehicle having a longitudinal dimension defined by opposite ends to a second vehicle having a pair of support wheels each having a rim portion, the hookup device comprising the combination as defined in claim 3, wherein:

the fluid motor means comprises a fluid cylinder means connected to the first vehicle between the two journal sleeve members;

a pair of piston members reciprocally disposed in the fluid cylinder means;

a piston rod connected to each of the piston members, the piston rods extending through opposite ends of the fluid cylinder means and being connected to the respective journal pin member; and, means for selectively introducing fluid into the fluid cylinder means through a center fluid port located between the two piston members for moving the piston members apart, and, alternately, through outer fluid ports located outside the piston members for moving the piston members together and for providing continuous fluid communication between the outer faces of the piston members.

5. A hookup device for connecting a first vehicle having a longitudinal dimension defined by opposite ends to a second vehicle having a pair of support wheels each having a rim portion, the hookup device comprising the combination as defined in claim 4 wherein the means for selectively introducing fluid into the cylinder means comprises:

a fluid cylinder;

a fluid piston reciprocally disposed in the fluid cylinder;

a piston rod connected to the fluid piston and extending through one end of the fluid cylinder, the piston rod having a threaded portion disposed outside the fluid cylinder;

means connected to the threaded portion of the piston rod for rotating the threaded portion;

threaded means operatively engaging the threaded portion of the piston rod for moving the piston rod and the fluid piston within the fluid cylinder when the threaded portion is rotated;

first fluid conduit means interconnecting one end of the fluid cylinder and the center fluid port in the fluid cylinder means; and, second fluid conduit means interconnecting the other end of the fluid cylinder and the outer fluid ports in the fluid cylinder means, the second fluid conduit means including means for providing continuous fluid communication between the outer fluid ports.

6. A hookup device for connecting a first vehicle having a longitudinal dimension defined by opposite ends to a second vehicle having a pair of support wheels each having a rim portion, the hookup device comprising the combination as defined in claim 3, wherein:

each of the cleat means comprises a cleat roller journaled on a stub axle extending normal to the respective arm member, and the combination is further characterized by, a roller journaled on each of the arm members for engaging the support wheels and properly spacing the cleat rollers on the respective rims.

7. A hookup device for connecting a first vehicle having a longitudinal dimension defined by opposite ends to a second vehicle having a pair of support wheels each having a rim portion as defined in claim 3 further characterized by:

an elongated stop means disposed in fixed relationship relative to each of the journal sleeve members and extending parallel to each of the journal pin members; and, cam means connected to each of the journal pin members for engaging the elongated stop means and limiting rotational movement of the respective journal pin member at a point such that the downward pivotation of the respective arm member connected thereto will be stopped before the arm engages the ground, whereby the arm members will be held in position for ready engagement with the respective rim portions of the support wheels.

8. A hookup device for connecting a first vehicle having a longitudinal dimension defined by opposite ends to a second vehicle having a pair of support wheels each having a rim portion as defined in claim 7, wherein:

the journal sleeve members are further characterized as having adjacent inner ends and remote outer ends;

the journal pin members are further characterized as having adjacent inner ends disposed between the inner ends of the journal sleeve members and remote outer ends disposed beyond the outer ends of the journal sleeve members;

the cam means are connected to the inner ends of the respective journal pin members and stop the outward movement of the respective journal pin members when the cam means engage the inner ends of the respective journal sleeve members;

the respective arm members are connected to the outer ends of the respective journal pin members and stop the inward movement of the respective journal pin members when the respective arm members contact the outer ends of the respective sleeve members; and, the total distance between the respective cam means and the adjacent inner ends of the respective journal sleeve members exceeds the total distance between the respective arm members and the adjacent outer ends of the respective journal sleeve members at least by the total distance the arm members must be moved in order to disengage both of the cleat means from the respective rim portions.

9. A hookup device for connecting a first vehicle having a longitudinal dimension to a second vehicle having a pair of support wheels each having a rim portion as defined in claim 1 wherein the fluid motor means is comprised of:

a fluid motor member connected to each arm member, the fluid motor members having facing and opposite fluid working surfaces, means for selectively applying power fluid to the facing fluid working surfaces or to the opposite fluid working surfaces while maintaining fluid communication between the facing fluid working surfaces and maintaining fluid communication between the opposite fluid working surfaces, whereby the arms may be moved toward each other by applying power fluid to the opposite fluid working surfaces, may be moved away from each other by applying power fluid to the facing fluid working surfaces, and may be maintained in predetermined spaced relationship while being free to move transversely of the first vehicle by reason of the fluid communication between the facing fluid working surfaces and the fluid communication between the opposite fluid working surfaces.

10. A hookup device for connecting a first vehicle having a longitudinal dimension to a second vehicle having a pair of support wheels each having a rim portion as defined in claim 3 wherein the fluid motor means is comprised of:

a piston connected to each of the journal pin members, the pistons having facing fluid working surfaces and opposite fluid working surfaces, and means for selectively applying power fluid to the facing fluid working surfaces or to the opposite fluid working surfaces while maintaining fluid communication between the facing fluid working surfaces and maintaining fluid communication between the opposite fluid working surfaces, whereby the pistons and therefore the arms may be moved toward each other by applying power fluid to the opposite fluid working surfaces, may be moved away from each other by applying power fluid to the facing fluid working surfaces, and may be maintained in predetermined spaced relationship while being free to move transversely of the first vehicle by reason of the fluid communication between the facing fluid working surfaces and the fluid communication between the opposite fluid working surfaces.

11. A hookup device for connecting a first vehicle having a longitudinal dimension defined by opposite ends to a second vehicle having a pair of support wheels each having a rim portion as defined in claim 3, wherein:

the journal sleeve members are further characterized as having adjacent inner ends and remote outer ends;

the journal pin members are further characterized as having adjacent inner ends disposed between the inner ends of the journal sleeve members and remote outer ends disposed beyond the outer ends of the journal sleeve members;

the respective arm members are connected to the outer ends of the respective journal pin members and stop the inward movement of the respective journal pin members when the respective arm members contact the outer ends of the respective sleeve members; and the lockup device is further characterized by stop means connected to the inner ends of the respective journal pin members for stopping the outward movement of the respective journal pin members when the stop means engage the inner ends of the respective journal sleeve members; and the total distance between the respective stop means and the adjacent inner ends of the respective journal sleeve members exceeds the total distance between the respective arm members and the adjacent outer ends of the respective journal sleeve members by at least the total distance the arm members must be moved in order to disengage both of the cleat means from the respective rim portions.

References Cited in the file of this patent

UNITED STATES PATENTS

| | | |
|---|---|---|
| 1,774,656 | Miller | Sept. 2, 1930 |
| 2,568,445 | Grattan | Sept. 18, 1951 |
| 2,954,241 | Warren | Sept. 27, 1960 |
| 3,095,788 | Odell | July 2, 1963 |